United States Patent [19]

Mandrin

[11] 4,184,325

[45] Jan. 22, 1980

[54] PLANT AND PROCESS FOR RECOVERING WASTE HEAT

[75] Inventor: Charles Mandrin, Winterthur, Switzerland

[73] Assignee: Sulzer Brothers Limited, Winterthur, Switzerland

[21] Appl. No.: 809,399

[22] Filed: Jun. 23, 1977

[30] Foreign Application Priority Data

Dec. 10, 1976 [CH] Switzerland .................. 15564/76
Apr. 4, 1977 [CH] Switzerland .................... 4112/77

[51] Int. Cl.² ................................... F02C 7/02
[52] U.S. Cl. ................... 60/39.18 R; 122/7 R; 165/66; 165/107 R
[58] Field of Search ............. 60/39.18 R, 39.18 B, 60/618, 671, 678; 122/7 R; 165/106, 66, 107

[56] References Cited

U.S. PATENT DOCUMENTS

| 1,946,234 | 2/1934 | Price | 165/175 |
|---|---|---|---|
| 3,232,707 | 2/1966 | Nebgen | 60/671 |
| 3,421,978 | 1/1969 | Gollion et al. | 60/644 |
| 3,742,708 | 7/1973 | Vidal et al. | 60/678 |
| 3,841,270 | 10/1974 | Sokolowsko | 122/7 R |
| 3,888,084 | 6/1975 | Hawkins | 60/618 |
| 4,041,709 | 8/1977 | Rajakovics | 60/671 |
| 4,044,820 | 8/1977 | Nobles | 165/107 |

FOREIGN PATENT DOCUMENTS 187553 12/1905 Fed. Rep. of Germany .......... 165/107

Primary Examiner—Louis J. Casaregola
Attorney, Agent, or Firm—Kenyon & Kenyon

[57] ABSTRACT

A flow of hot combustion gas from an open gas turbine plant surrenders heat via an intermediate forced-flow circuit to a vapor circuit system in which a hydrocarbon working medium flows. The forced-flow intermediate circuit uses a liquid heat vehicle such as a mixture of diphenyl and diphenyl oxide to transfer heat from the hot exhaust gas of the open gas turbine plant to the working medium of the vapor circuit system. This heat vehicle is passed through a plurality of successively connected tubes in the exhaust gas duct so as to reduce the amount of leakage should a leak occur in the tubes and, thus, the chance of an explosion.

The waste heat transferred to the vapor circuit system can be used to drive a compressor of a refrigerating circuit, e.g. used to cool a flow of natural gas in a pipeline located in an arctic region.

18 Claims, 3 Drawing Figures

PLANT AND PROCESS FOR RECOVERING WASTE HEAT

This invention relates to a plant and process for recovering waste heat from an open gas turbine plant. More particularly, this invention relates to a plant and process for cooling natural gas piped in arctic zones.

As is known, open gas turbine plants are frequently combined with vapor circuits in order to recover at least some of the waste heat of the turbine plant. Generally, the vapor circuit employs a working medium which is heated by the waste heat of the combustion gases of the turbine plant, thereafter expanded to perform work, then condensed and again heated. In many instances, the working medium is water.

However, in some cases, water cannot be used, such as where the plant is located in a cold area where there is a risk of freezing, or when an appropriate monitoring of the plant operation is possible only with an uneconomically high expenditure, or where a water source is not available. In these cases, the working medium is a hydrocarbon, a hydrocarbon mixture, or a hydrocarbon and carbon dioxide. Media of this kind are thermally stable even at relatively high temperatures, for example in the range of from 200° C. to 400° C. That is, these media do not undergo any chemical decomposition at these temperatures. Further, even if traces of decomposition occur at these temperatures, they are always other hydrocarbons which are not corrosive, that is, these products do not intefere with the operation of the plant.

Accordingly, it is an object of the invention to provide an efficient means of recovering waste heat from open gas turbine plants.

It is another object of the invention to provide a plant which can be operated in an extremely economic manner.

It is another object of the invention to provide a means for ensuring the operational reliability of a plant for recovering waste heat.

It is another object of the invention to provide a heat exchange system which is reliable and which can be used in the remote control of a plant.

Briefly, the invention provides an apparatus and process for recovering waste heat from an open gas turbine plant.

The apparatus comprises an open gas turbine plant which has an exhaust gas duct for exhausting hot combustion gases, a vapor circuit system and a forced-flow intermediate circuit. The vapor circuit system includes a condensor for condensing a flow of working medium, at least one pump for pumping the flow of working medium in the circuit system, a heater for heating the flow of working medium in the circuit system and an expansion machine for expanding the heated flow of working medium. The forced-flow intermediate circuit has a liquid heat vehicle flowing therethrough along with a plurality of tubes in the exhaust gas duct to transfer heat from the hot combustion gases to the liquid heat vehicle and a plurality of tubes in the heater to transfer heat from the liquid heat vehicle to the working medium of the vapor circuit medium.

The tubes of the intermediate circuit are serially arranged as passes with each respective pass extending from one end to an opposite end of the exhaust duct and the heater relative to the flow of hot combustion gases and working medium with each pass disposed with a net flow direction countercurrent to the respective flows of hot combustion gases and working medium.

The process of recovering waste heat from an open gas turbine plant having an exhaust gas duct for exhausting hot combustion gases comprises the steps of forming a vapor circuit system in which a working medium is heated, expanded in an expansion machine and then condensed and circulating a liquid heat vehicle through the exhaust gas duct and the vapor circuit system in a plurality of sequentially arranged forced-flow passes in order to transfer heat from the hot combustion gases to the working medium. In this way, the heat vehicle is repeatedly heated in succession in heat exchange with the hot combustion gases and cooled between each heating in heat exchange with the working medium.

As is known, natural gas which is piped from one place to another is usually in a compressed condition. In the case of natural gas pipes which are laid in arctic regions in frozen ground, it has been necessary to remove the heat of compression of the natural gas in order to avoid melting of the ice in the soil in the region where the pipes are laid. Thus, a natural gas piping system generally includes stations which are disposed at intervals with gas turbine and refrigerating plants or else just one station disposed at the natural gas source, i.e. near a well, and intended to convey and cool the natural gas in the piping system.

The apparatus and process of the invention can be used in these instances to assure compression of the natural gas while allowing remote control of the station or stations along the piping system. To this end, a plant for cooling natural gas which is piped in an arctic zone includes a compressor for compressing the flow of natural gas and a refrigerating plant for cooling the zone of compressed gas. In addition, the refrigerating plant has a heat exchanger for transferring heat from the flow of compressed gas to a refrigerant, a compressor for compressing the heated refrigerant, a condensor for condensing the heated refrigerant and a throttle means for throttling the flow of refrigerant to the heat exchanger.

In accordance with the invention, the gas compressor is driven from the gas turbine plant while the expansion machine of the vapor circuit is drivingly connected to the compressor of the refrigerating plant.

The invention thus makes it possible to have the heat transfer from the hot combustion gases of the gas turbine to the vapor circuit medium before expansion to perform work effected with extreme operational reliability. To this end, certain parameters must be considered.

First, the vapor circuit working medium must be thermally stable in the region of the maximum temperatures occurring in the vapor circuit, for example about 400° C.

Second, on decomposition of the medium, the decomposition products must not be corrosive. Further, the cheapest possible working medium must be used for economic reasons. A medium of this kind, for example may be propane or possibly a mixture consisting of butane and ethane. Other unsubstituted or halogen-substituted hydrocarbons may also be used as the working medium for the vapor circuit provided they have the above-mentioned properties.

The use of a forced-flow intermediate circuit for transmitting the waste heat of the hot combustion gases to the vapor circuit working medium, e.g. propane, gives a spatial separation between these media and the combustion gases. If, for example, the heat transfer were to take place directly in the exhaust gas duct and, if the ducts in the exhaust gas duct were to leak, propane would escape into the exhaust gas duct in relatively large quantities. This might well result in detonation and destruction of the plant because propane forms a highly explosive mixture with the combustion gases which would be in the gas duct. In particular, at standstill of the plant, propane could penetrate into the gas turbine plant combustion chamber and causes an explosion on the next start-up of the plant. This danger is, however, precluded by using the intermediate circuit.

The choice of the heat vehicle depends on the temperature zone in which the heat transfer takes place. The heat vehicle should be as thermally stable as possible in this zone and if decomposition products do occur on a small scale they must not be corrosive. The media used as the heat vehicle must also be cheap and compatible with the environment and have a low partial pressure, for example of the order of not more than 50 bar at 400° C. Otherwise, the intermediate circuit tubes become uneconomic. Further, the heat vehicle should not experience any increase in volumn in the event of freezing.

The heat vehicle may, for example, be a hydrocarbon such as a diphenyl ($C_{12}H_{10}$) or a hydrocarbon oxide such as diphenyl oxide ($C_{12}H_{10}O$) or a mixture of these two media which is commercially available as Dowtherm A or Diphyl or a silicone oil or a mixture of silicone oils.

It would be possible to use a forced-flow intermediate circuit in which the entire throughput is heated and cooled in a single pass. However, since the maximum quantity escaping into the exhaust gas duct in the event of a leak in the tube system, for example due to a material defect or destruction of a weld seam under temperature stresses, would be equal to the throughput (the throughput is determined by the amount of heat which must be transferred to the heat vehicle from the combustion gases), this throughput can form explosive mixtures with the ambient air. Alternatively, only partial evaporation may take place so tha the liquid heat vehicle might collect in the gas turbine and subsequently fully evaporate and result in explosive mixtures. Accordingly, the throuhput is divided into a number of passages. That is, the number of passages of the heat vehicle through the combustion chamber is made very large so that the throughput emerging from a leak in a tube can be limited per unit of time.

Should one or two tubes leak during operation, only a small amount of the heat vehicle can escape per unit of time into the exhaust gas duct. Hence, the risk of an explosive mixture forming in the exhaust gas duct or in the gas turbine or in the atmosphere above the exhaust gas chimney is eliminated. The throughput, of course, is determined by the delivery of the pump in the forced-flow intermediate circuit.

When the plant has only one heat exchange system between the combustion gases and the vapor circuit medium, the power delivered by the expansion machine to the refrigerant compressor may not fully cover the power required to drive this compressor. In this case, an additional energy source such as an additional gas turbine would have to be used to cover the remaining drive power required. However, in order to avoid this, at least two forced-flow intermediate circuits are provided. In addition, a heat exchanger is provided upstream of each heater as considered in the direction of flow of the medium. The heat exchanger serves to place the flow of working medium to the expansion machine in exchange relation with the flow of working medium expanded and flowing from the expansion machine. In this case, the refrigerant compressor drive power can be completely supplied by the expansion machine. The expansion machine, in this case, can be in the form of an expansion turbine.

It is advantageous to use the same medium in the refrigerating plant as in the vapor circuit system and to couple the two together via the condensor.

In addition to the above-mentioned application of the invention to the delivery and cooling of natural gas in arctic zones, in which case the load is a refrigerating plant compressor, the loads driven by the expansion machine, e.g. an expansion turbine in the vapor circuit or the gas turbine may, for example, be generators for power supplies, compressors or pumps for chemical processes, or compressors or pumps for the delivery of gases, e.g. natural gas or liquids, e.g. crude oil.

These and other objects and advantages of the invention will become more apparent from the following detailed description and appended claims taken in conjunction with the accompanying drawings in which:

Figure 1:
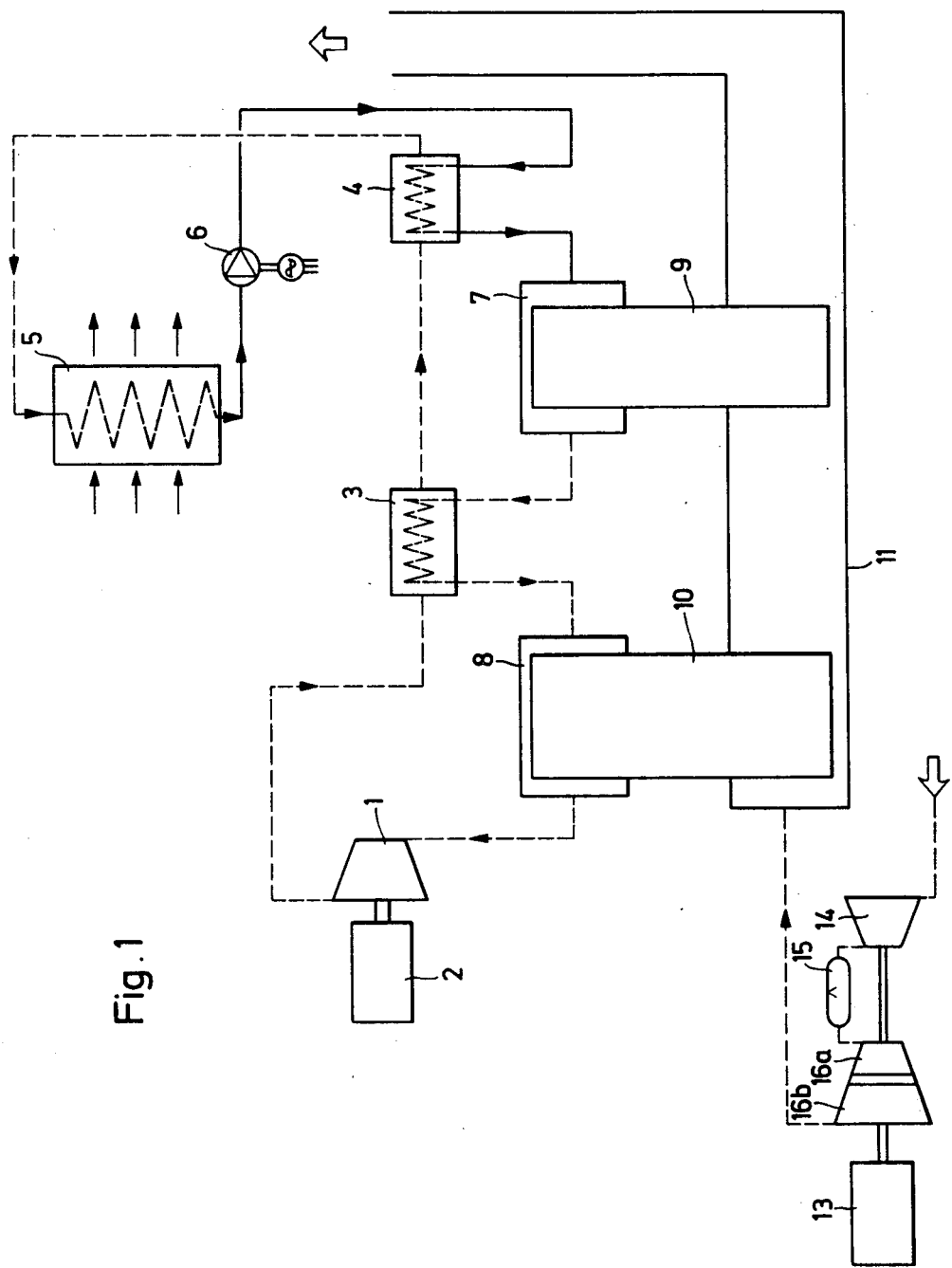
FIG. 1 illustrates a flow diagram of a plant constructed in accordance with the invention.

Referring to FIG. 1, the plant includes an open gas turbine plant for driving a load 13. This gas turbine plant is constructed in known manner and comprises a compressor 14, a combustion chamber 15, a compressor turbine 16a, and a service turbine 16b. As shown in FIG. 1, the turbine 16a, 16b serve to drive the load 13. In addition, the gas turbine plant has an exhaust gas duct 11 for exhausting hot combustion gases.

The plant also has a vapor circuit system for driving a load 2, for example a compressor for delivery of natural gases. This vapor circuit employs a working medium such as propane and includes an expansion turbine 1 in which the propane is expanded to perform work to drive the compressor 2. In addition, the vapor circuit system includes a condensor 5 for condensing the flow of working medium, at least one pump 6 for pumping the flow of working medium in the circuit system, a pair of heat exchangers 3, 4 and a pair of heaters 7, 8 for heating the flow of working medium. As shown, the working medium is cooled in the condensor 5 by heat exchange with a coolant, for example air or water; the direction of entry and exit of the coolant being shown by arrows. Also, as shown, the turbine 1 is drivingly connected to the compressor 2.

In addition, a pair of forced-flow intermediate circuits 9, 10 are provided between the vapor circuit system and the exhaust duct 11. Each intermediate circuit 9, 10 employs a liquid heat vehicle, such as Dowtherm A and has a plurality of tubes disposed in the exhaust gas duct 11 to transfer heat from the hot combustion gases to the liquid heat vehicle and a plurality of tubes in the heaters 7, 8 to transfer heat from the liquid heat vehicle to the working medium of the vapor circuit system (FIG. 2).

Figure 2:
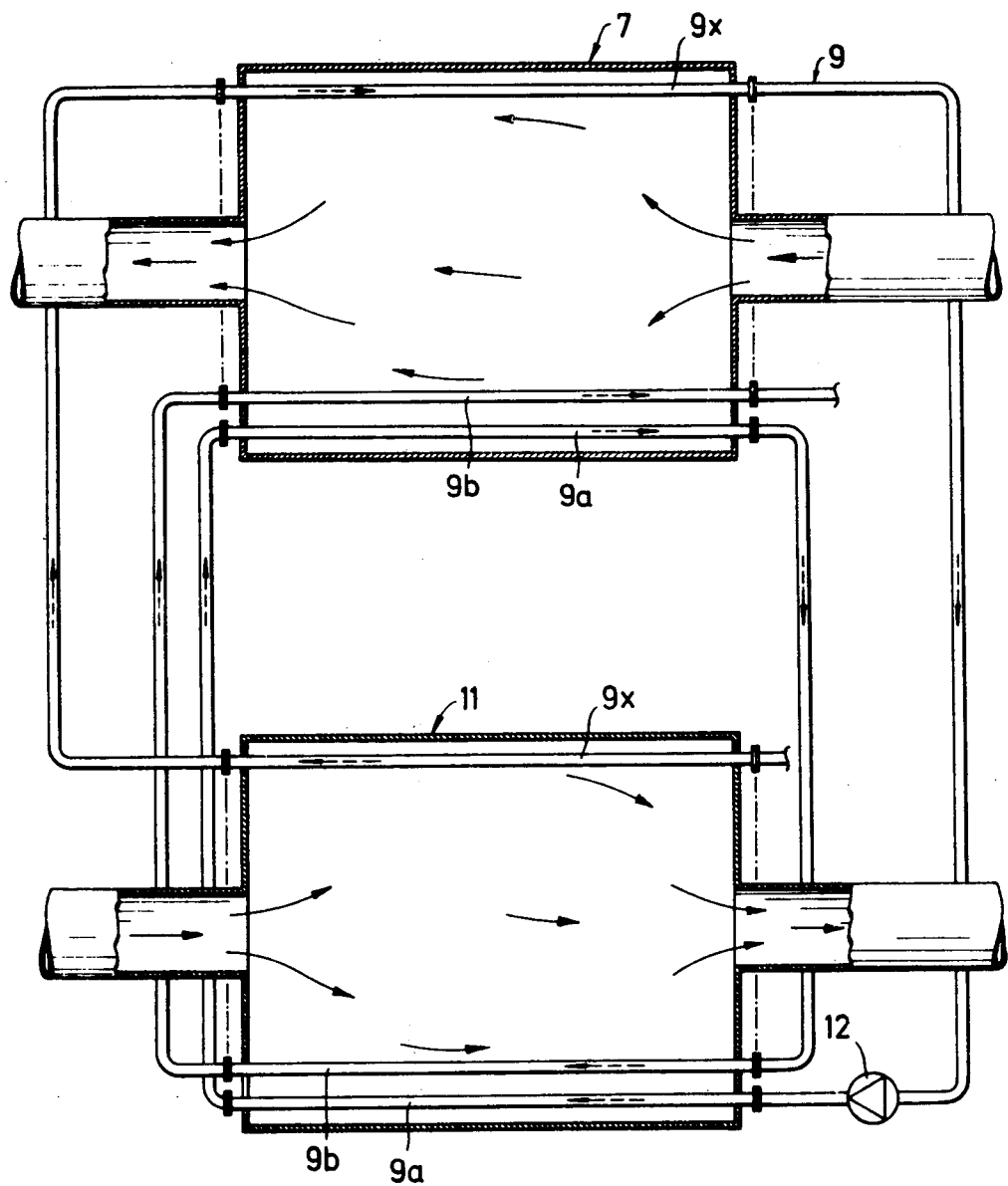
FIG. 2 illustrates one embodiment of a forced-flow intermediate circuit cooperating with a heater of the vapor circuit system in the exhaust gas duct.

Referring to FIG. 2, each forced-flow intermediate circuit 9, 10 is of similar construction and includes a pump 12 for circulating the liquid heat vehicle through a multiplicity of passes or passages 9a, 9b, 9x. As shown, these passages are disposed in the heater 7 and in the gas turbine plant exhaust gas duct 11 to extend from one end to the opposite end of the heater 7 and gas duct 11 relative to the flow of hot combustion gases and working medium. As shown, each pass has axial symmetry with the respective path axes disposed in parallel. As noted above, the throughput decreases with an increasing number of passages and the amount of the heat vehicle escaping per unit of time in the event of a leak occurring in the piping system is reduced accordingly. For example, there may be 80 passes in the intermediate circuit 9 of which only three passes are shown, i.e. the first two 9a, 9b and the last 9x. As illustrated, each pass 9a–9x is in the form of a straight tube in the heater 7 and duct 11.

During operation, heat is transmitted from the hot combustion gases in the duct 11 to the heat vehicle on each passage. After each heating, the working medium of the vapor circuit, e.g. propane, is heated in the heater 7 by heat exchange with the heated heat vehicle while the heat vehicle is cooled.

Instead of the construction as illustrated, the heaters 7, 8 can be divided up into a number of parallel connected jacketed tube exchange elements (not shown). Also, each tube in the heaters 7, 8 and in the gas duct 11 could consist of a nest of tubes with the individual tubes of each nest being interconnected at the opposite end by headers.

When the plant is in operation, the medium expanded in the expansion turbine 1 is cooled in the heat exchangers 3, 4 and liquified in the cooled condensor 5. The working medium is then pressurized in the pump 6. This pressure may be in either the sub-critical or super-critical zone. The medium is then heated in the heat exchanger 4 by heat exchange with the medium expanded to perform work and then reheated in the heater 7 by heat exchange with the heat vehicle. Thereafter, the working medium is heated in the heat exchanger 3 and the heater 8 before being expanded in the turbine 1 to perform work.

Figure 3:
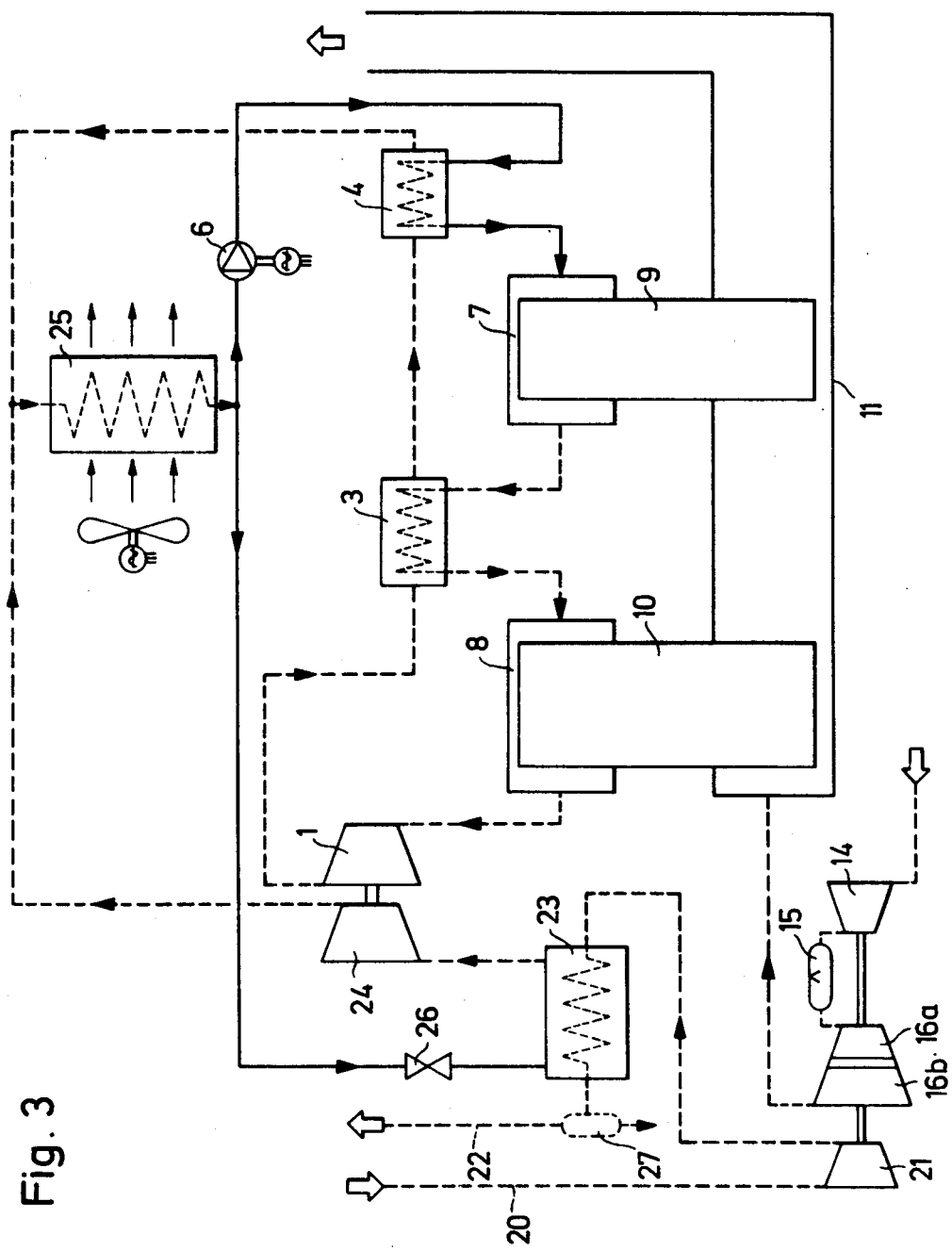
FIG. 3 illustrates a flow diagram of a plant coupled to a refrigerating plant used for delivery and cooling of natural gas in an arctic zone.

Referring to FIG. 3, wherein like reference characters indicate like parts as above, the open gas turbine plant, vapor circuit system and intermediate circuits can be coupled with a plant for delivery and cooling of a flow of natural gas in an arctic zone. As shown, a flow of natural gas is conducted via a pipeline 20 which is laid in frozen ground to a compressor 21 which compresses the gas and thereafter directs the gas to a refrigerating plant for cooling the flow of compressed natural gas passing from the compressor 21. The cooled gas is then conducted via another pipeline 22 in the ground to a subsequent station. The refrigerating plant includes a heat exchanger 23 which functions as an evaporator of the refrigerant circuit for transferring heat from the flow of compressed natural gas to a refrigerating such as propane. In addition, the refrigerating plant includes a compressor 24 in which the evaporated refrigerant is compressed, an air cooled condensor 25 for condensing the heated refrigerant to a liquified state, and a throttle means 26 such as a throttle valve for throttling a flow of refrigerant back to the heat exchanger 23.

Referring to FIG. 3, a droplet separator 27 may be disposed in the pipe 22 downstream of the heat exchanger 23. A droplet separator 27 of this kind is useful for the separation of the heavy hydrocarbon such as $C_3H_8$ from the flow of natural gas. This is of value if the plant does not have an intermediate station in the natural gas network and the station is disposed directly at the natural gas source, that is, near the well.

In this embodiment, the working medium of the vapor circuit system is the same as the refrigerant, that is, propane. Thus, as illustrated, the refrigerating plant and the vapor circuit system are coupled via the common condensor 25 since the same medium, e.g. propane circulates in both circuits.

A numerical example will now be given with the main variable quantities in details of throughputs in the overall system.

By way of example, 104 kg/s of propane were heated in the vapor circuit from 230° C. to 309° C. by means of 117.5 kg/s of combustion gases, the latter cooling from 461° C. to 277° C. Dowtherm A is used as the heat vehicle in each forced-flow intermediate circuit 9, 10, the throughput being 1.3 kg/s, and flows through 80 series-connected tube passages. If a leak occurs in the forced-flow intermediate circuit tube system during operation, the circulation pump 12 (FIG. 2) can inject only 1.3 kg/s liquid into the exhaust gas duct 11. The bottom explosion limit of Dowtherm A in air at 400° C. is 3% by weight of air. This would correspond to 3.5 kg/s Dowtherm A.

If the construction of an intermediate circuit with 80 tube passages were replaced by a forced-flow intermediate circuit with just a single passage through the exhaust gas duct 11 and the heater 7, 8, then the liquid throughput or pump delivery in this system would be 80×1.3 kg/s or 104 kg/s. In the event of a tube rupture, this quantity of liquid, i.e. 104 kg per second, would flow into the exhaust gas duct 11 and form an explosive mixture with the combustion gases.

What is claimed is:
1. The combination comprising
   an open gas turbine plant having an exhaust duct for exhausting hot combustion gases;
   a vapor circuit system including a condenser for condensing a flow of working medium, at least one pump for pumping the flow of working medium in said circuit system, a heater for heating the flow of working medium in said circuit system, and an expansion machine for expanding the heated flow of working medium; and
   a forced-flow intermediate circuit having a liquid heat vehicle flowing therethrough, said intermediate circuit having a tube with a multiplicity of consecutive passes serially disposed in alternating relation in said exhaust gas duct and said heater to transfer heat from the hot combustion gases to the liquid heat vehicle in said exhaust gas duct and to transfer heat from the liquid heat vehicle to the working medium of said vapor circuit system in said heater, each respective pass extending from one end to an opposite end of said exhaust duct and said heater relative to the flow of hot combustion gases and working medium, each pass being disposed with a net flow direction countercurrent to the respective flows of hot combustion gases and working medium.

2. The combination as set forth in claim 1 wherein said heater of said vapor circuit system is sub-divided into a plurality of parallel compartments.

3. The combination as set forth in claim 1 wherein each pass in said exhaust gas duct and each pass in said heater each consists of a nest of tubes.

4. The combination as set forth in claim 1 wherein said passes in said exhaust gast duct number at least ten.

5. The combination as set forth in claim 1 wherein said vapor circuit further includes a heat exchanger upstream of said heater relative to the direction of flow of the working medium, said heat exchanger of said vapor circuit having the flow of working medium to said expansion machine in heat exchange relation with the flow of expanded working medium passing from said expansion machine.

6. The combination as set forth in claim 1 which includes two of said forced-flow intermediate circuits and wherein said vapor circuit further includes a pair of said heaters and a heat exchanger upstream of each respective heater relative to the direction of flow of the working medium, each said heat exchanger of said vapor circuit having the flow of working medium to said expansion machine in exchange relation with the flow of expanded working medium passing from said expansion machine.

7. The combination as set forth in claim 1 wherein said passes in said exhaust gas duct convey the liquid heat vehicle in countercurrent to the flow of hot combustion gases and said passes in said heater convey the liquid heat vehicle in countercurrent to the flow of working medium.

8. The combination as set forth in claim 1 wherein the working medium is propane.

9. The combination as set forth in claim 1 wherein the heat vehicle is a hydrocarbon.

10. The combination as set forth in claim 8 wherein the heat vehicle is a diphenyl.

11. The combination as set forth in claim 1 wherein the heat vehicle is a hydrocarbon oxide.

12. The combination as set forth in claim 11 wherein the heat vehicle is a diphenyl oxide.

13. The combination as set forth in claim 1 wherein the heat vehicle is mixture if diphenyl and diphenyl oxide.

14. The combination as set forth in claim 1 wherein the heat vehicle is one of a silicone oil and a mixture of silicone oil.

15. The combination as set forth in claim 1 wherein each pass has axial symmetry with the respective path axes disposed in parallel relation to each other within each respective exhaust duct and said heater.

16. The combination as set forth in claim 15 wherein said passes are in the form of straight tubes in each of said exhaust gas duct and said heater.

17. A process of recovering waste heat from an open gas turbine plant having an exhaust gas duct for exhausting hot combustion gases, said process comprising the steps of
forming a vapor circuit system in which a working medium is heated, expanded in an expansion machine and then condensed; and
circulating a liquid heat vehicle through the exhaust gas duct and the vapor circuit system in a plurality of serially arranged forced-flow passes extending from one end to an opposite end of each of the exhaust gas duct and vapor circuit system relative to the respective flows of hot combustion gases and working medium with each pass disposed with a net flow direction countercurrent to the respective flows of hot combustion gases and working medium to transfer heat from the hot combustion gases to the working medium whereby the heat vehicle is repeatedly heated in succession in heat exchange with the hot combustion gases and cooled between each heating in heat exchange with the working medium.

18. The combination comprising
an open gas turbine plant having an exhaust gas duct for exhausting hot combustion gases;
a vapor circuit system including a condenser for condensing a flow of working medium, at least one pump for pumping the flow of working medium in said circuit system, a pair of heaters for heating the flow of working medium in said circuit system, an expansion machine for expanding the heated flow of working medium; and a heat exchanger upstream of each respective heater relative to the direction of flow of the working medium, each said heat exchanger having the flow of working medium to said expansion machine in exchange relation with the flow of expanded working medium passing from said expansion machine; and
a pair of forced-flow intermediate circuits having a liquid heat vehicle flowing therethrough, each said intermediate circuit having a plurality of tubes disposed in said exhaust gas duct to transfer heat from the hot combustion gases to the liquid heat vehicle and a plurality of tubes in said heater to transfer heat from the liquid heat vehicle to the working medium of said vapor circuit system.

* * * * *

UNITED STATES PATENT AND TRADEMARK OFFICE
CERTIFICATE OF CORRECTION

PATENT NO. : 4,184,325
DATED : January 22, 1980
INVENTOR(S) : Charles Mandrin

It is certified that error appears in the above-identified patent and that said Letters Patent are hereby corrected as shown below:

Column 1, line 31, change "intefere" to --interfere--

Column 2, line 35, change "zone" to --flow--

Column 3, line 10, change "causes" to --cause--

Column 3, line 42, change "tha" to --that--

Column 3, line 45, change "throuhput" to --throughput--

Column 5, line 57, change "refrigerating" to --refrigerant--

Column 7, line 41, after "is" insert --a--; change "if" to --of--

Column 7, line 45, change "oil" to --oils--

Signed and Sealed this

Twentieth Day of May 1980

[SEAL]

*Attest:*

*Attesting Officer*

SIDNEY A. DIAMOND

*Commissioner of Patents and Trademarks*